US012699235B2

(12) United States Patent
Huang

(10) Patent No.: US 12,699,235 B2
(45) Date of Patent: Aug. 4, 2026

(54) SINGLE-FIBER MULTIPLEX TRANSMISSION SYSTEM

(71) Applicant: SHUNYUN TECHNOLOGY (ZHONG SHAN) LIMITED, Zhongshan (CN)

(72) Inventor: Jie Huang, Zhongshan City (CN)

(73) Assignee: SHUNYUN TECHNOLOGY (ZHONG SHAN) LIMITED, Zhongshan (CN)

( * ) Notice: Subject to any disclaimer, the term of this patent is extended or adjusted under 35 U.S.C. 154(b) by 243 days.

(21) Appl. No.: 18/386,312

(22) Filed: Nov. 2, 2023

(65) Prior Publication Data

US 2024/0241327 A1 Jul. 18, 2024

(30) Foreign Application Priority Data

Jan. 13, 2023 (CN) .......................... 202310084715.9

(51) Int. Cl.
G02B 6/42 (2006.01)
G02B 6/43 (2006.01)

(52) U.S. Cl.
CPC ............. G02B 6/4214 (2013.01); G02B 6/43 (2013.01)

(58) Field of Classification Search
CPC .. G02B 6/4214; G02B 6/4246; G02B 6/4215; G02B 6/43
See application file for complete search history.

(56) References Cited

U.S. PATENT DOCUMENTS

2021/0149129 A1* 5/2021 Wei ...................... G02B 6/4246

FOREIGN PATENT DOCUMENTS

| CN | 101248384 | A | * | 8/2008 |
| CN | 208110107 | U | * | 11/2018 |
| CN | 210401756 | U | | 4/2020 |
| TW | I325698 | B | | 6/2010 |

* cited by examiner

*Primary Examiner* — Michael P Mooney
(74) *Attorney, Agent, or Firm* — ScienBiziP, P.C.

(57) ABSTRACT

A single-fiber multiplexing transmission system comprises an emitting device, at least one transmitter, and a receiving device. The emitting device comprises a first emitter, a second emitter, and an optical multiplexer. The optical multiplexer receives and transmits the first light beam emitted by the first emitter and the second light beam emitted by the second emitter to the emitting device. Subsequently, these beams are transmitted to the receiving device through the transmitter. The receiving device comprises a first analyzer, a second analyzer, and a beam splitter. The beam splitter receives both the first light beam and the second light beam and directs them to the first analyzer and the second analyzer for an individual analysis.

14 Claims, 4 Drawing Sheets

SINGLE-FIBER MULTIPLEX TRANSMISSION SYSTEM

FIELD

The subject matter herein generally relates to an optical component, particularly a single-fiber multiplexing transmission system that can simultaneously transmit different optical signals.

BACKGROUND

Optical fiber is a type of conductor made from glass or transparent plastic, where light waves are transmitted within the optical fiber through total internal reflection. Due to the low signal loss in optical fiber transmission compared to electronic transmission through wires, as well as its advantages such as high communication capacity, strong resistance to electromagnetic interference, and cost-effectiveness, optical fiber transmission has gradually become widely utilized in various signal transmission applications.

Currently, when transmitting light waves through optical fibers, each light wave with a different wavelength requires a separate optical fiber cable. Therefore, when four light wave emitting device emit signals at different wavelengths, four optical fiber cables are needed to connect to the respective emitting devices. Consequently, as the transmission distance increases, the cost of optical fiber cables also doubles.

Therefore, designing a single-fiber multiplexing transmission system capable of simultaneously transmitting various types of different optical signals could effectively address the aforementioned issue.

BRIEF DESCRIPTION OF THE DRAWINGS

Many aspects of the present disclosure are better understood with reference to the following drawings. The components in the drawings are not necessarily drawn to scale, the emphasis instead being placed upon clearly illustrating the principles of the present disclosure. It will be appreciated that for simplicity and clarity of illustration, where appropriate, reference numerals have been repeated among the different figures to indicate corresponding or analogous elements.

DETAILED DESCRIPTION

Figure 1:
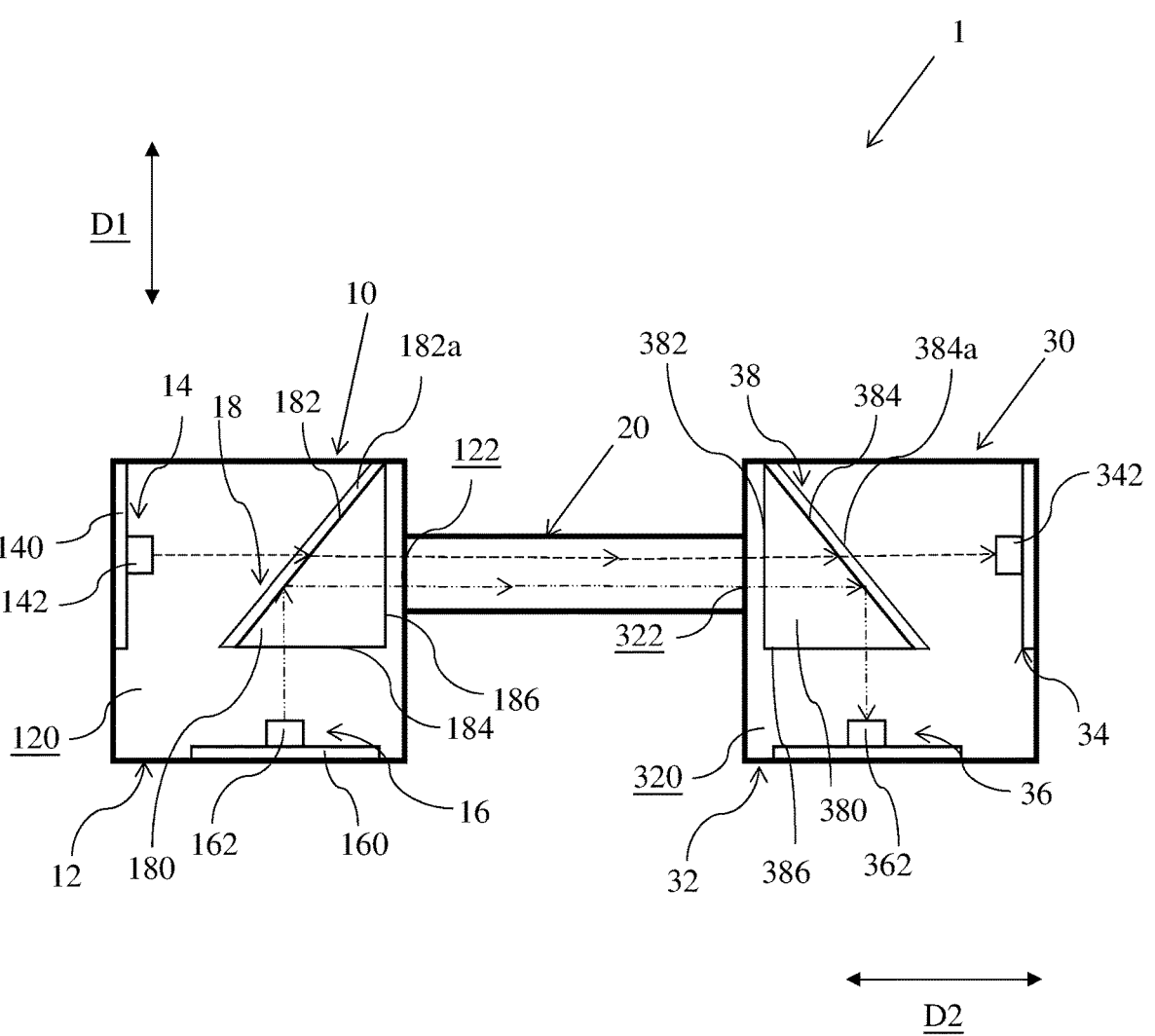
FIG. 1 is a cross-sectional schematic diagram illustrating a single-fiber multiplexing transmission system according to a first embodiment of the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

The disclosure is illustrated by way of example and not by way of limitation in the figures of the accompanying drawings, in which like references indicate similar elements. It should be noted that references to "an" or "one" embodiment in this disclosure are not necessarily to the same embodiment, and such references mean "at least one".

The term "coupled" is defined as connected, whether directly or indirectly through intervening components, and is not necessarily limited to physical connections. The connection can be such that the objects are permanently connected or releasably connected. The term "comprising," when utilized, means "including, but not necessarily limited to;" it specifically indicates open-ended inclusion or membership in the so-described combination, group, series, and the like.

Please refer to FIG. 1, which illustrates the first embodiment of the present invention. In this embodiment, a single-fiber multiplexing transmission system 1 is provided. The single-fiber multiplexing transmission system 1 comprises an emitting device 10, at least one transmitter 20, and a receiving device 30. In this embodiment, the single-fiber multiplexing transmission system 1 may include multiple transmitters 20. The transmitters 20 are connected to both the emitting device 10 and the receiving device 30. The single-fiber multiplexing transmission system 1 is used to connect a first electronic device with a second electronic device for the purpose of signal transmission.

The emitting device 10 is positioned within the first electronic device and is connected to it. The first electronic device generates electronic signals and controls the emitting device 10 to emit a first light beam containing a first optical signal and a second light beam containing a second optical signal. The first electronic device can be a server, router, computer, or similar electronic equipment. The receiving device 30 is positioned within the second electronic device and is connected to it. This connection enables the second electronic device to receive the first optical signal and the second optical signal, which have been analyzed by the receiving device 30 after their reception. The second electronic device can be a server, router, computer, or similar electronic equipment.

The structure of the emitting device 10 comprises a first casing 12, a first emitter 14, a second emitter 16, and an optical multiplexer 18. The first casing 12 comprising a first accommodation 120 space and an output port 122, and the output port 122 is connected to the first accommodation space 120. In this embodiment, the first casing 12 is equipped with a first accommodation space 120 and an output port 122. The output port 122 communicates with the first accommodation space 120 and is connected to the transmitters 20. Both the first emitter 14 and the second emitter 16 are positioned within the first accommodation space 120. In this embodiment, the first casing 12 comprises a side wall and a bottom plate, with the side wall being perpendicular to the bottom plate. The first emitter 14 is situated along a first direction D1 on the side wall of the first casing 12, while the second emitter 16 is positioned along a second direction D2 on the bottom plate of the first casing 12, where the first direction is perpendicular to the second direction. Consequently, the first emitter 14 is vertically aligned with respect to the extension of the second emitter 16. The first emitter 14 emits the first light beam along the second direction D2, while the second emitter 16 emits the second light beam along the first direction D1. The first light beam and the second light beam have different wavelengths. The first emitter 14 and the output port 122 are arranged along the second direction D2.

The first emitter 14 can be an emitter employing Vertical Cavity Surface-Emitting Laser (VCSEL) technology. The structure of the first emitter 14 comprises a first substrate 140 and at least one first light unit 142. In this embodiment, there are multiple first light units 142, and these units are arranged vertically along the first direction D1. In another embodiment, multiple first light units 142 can also be arranged in a matrix on the first substrate 140. Multiple first light units 142 can be arrayed on the first substrate 140. The first substrate 140 can be a printed circuit board and extends vertically along the second direction D2.

The first light unit 142 can be a light-emitting diode (LED). The first light unit 142 can be installed on the first substrate 140 using wire bonding packaging technology. The first light unit 142 is positioned corresponding to the optical multiplexer 18, and the first light unit 142 and the output port 122 are arranged along the second direction D2. The first substrate 140 can control the first light unit 142 to emit the first light beam towards the output port 122.

The second emitter 16 can be an emitter utilizing Vertical Cavity Surface-Emitting Laser (VCSEL) technology. The structure of the second emitter 16 comprises a second substrate 160 and at least one second light unit 162. In this embodiment, there are multiple second light units 162, and these units are arranged vertically along the second direction D2. In another embodiment, multiple second light units 162 can also be arranged in a matrix on the second substrate 160. Multiple second light units 162 can be arrayed on the second substrate 160. The second substrate 160 can be a printed circuit board and extends vertically along the first direction D1. The second light unit 162 can be a light-emitting diode (LED). The second light unit 162 can be installed on the second substrate 160 using wire bonding packaging technology, and the second light unit 162 is oriented towards the optical multiplexer 18. The second substrate 160 can control the second light unit 162 to emit the second light beam towards the optical multiplexer 18.

The optical multiplexer 18 is located within the first accommodation space 120 and corresponds to the placement of the first emitter 14 and the second emitter 16. The optical multiplexer 18 is situated between the first light unit 142 and the output port 122, and optical multiplexer 18, first light unit 142 and output port 122 are arranged along the second direction D2. The optical multiplexer 18 receives the first light beam and the second light beam, then transmits them to the output port 122.

Figure 2:
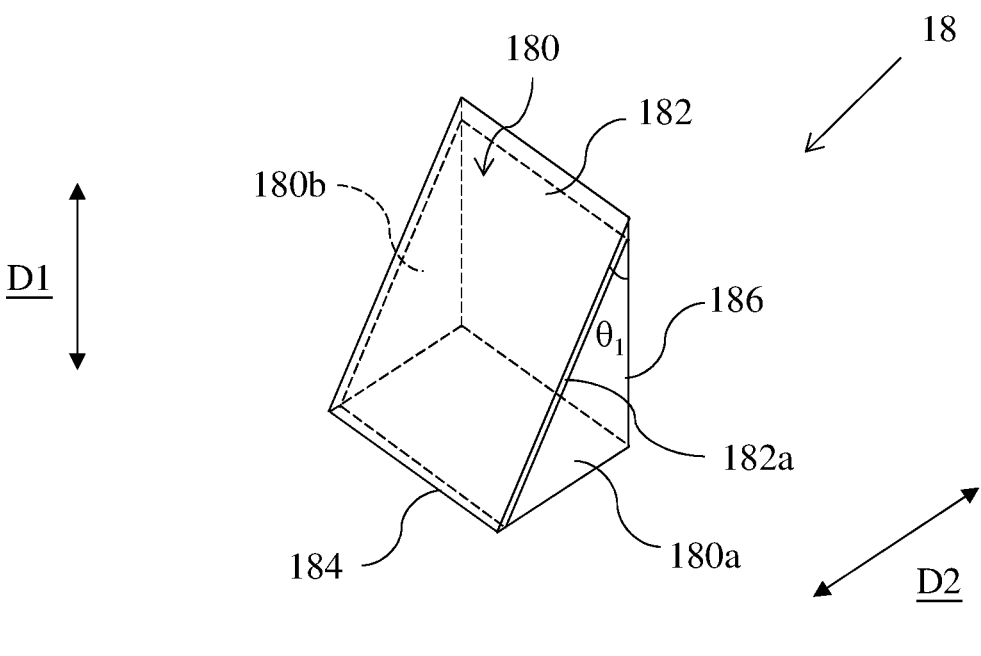
FIG. 2 is a schematic diagram illustrating an optical multiplexer according to the first embodiment of the present disclosure.

In accordance with reference to FIG. 1 and FIG. 2, a detailed explanation of the structure of the optical multiplexer 18 is provided. The optical multiplexer 18 consists of a mixing body 180 and a second filter layer 182a. The mixing body 180 has an incident inclined plane 182, a second incident surface 184, and a second light output surface 186. In this embodiment, the mixing body 180 can be a lens in the shape of a triangular prism, such as a right-angled triangular prism. The mixing body 180 comprises two opposite right-angled triangular sides 180a and 180b. The incident inclined plane 182, the second incident surface 184, and the second light output surface 186 form three rectangular sides at the edges of the surrounding sides 180a and 180b. The material of the mixing body 180 can be glass.

In detail, the incident inclined plane 182 is a rectangular plane positioned on the mixing body 180 and corresponds to the placement of the first emitter 14. On the incident inclined plane 182, there is a second filter layer 182a, which is a filter film. The second filter layer 182a can be made of glass or plastic film with added dye, or it can be made of materials like chromium oxide. Those skilled in the art can choose suitable materials to allow only a fixed range of wavelengths to pass through the second filter layer 182a, which can be between 850 nm and 900 nm. In this embodiment, the second filter layer 182a allows only the first light beam to pass through, which has a wavelength in the range of 850 nm to 900 nm. In this example, the first light beam has a wavelength of 855 nm, and the second light beam has a wavelength of 908 nm.

The second incident surface 184 is also a rectangular plane positioned on the mixing body 180. It is situated along the second direction D2, adjacent to the incident inclined plane 182, and facing the second emitter 16. The incident inclined plane 182 is tilted relative to the second incident surface 184. The second light output surface 186 is also a rectangular plane positioned on the mixing body 180, facing the output port 122. It is oriented along the first direction D1 and connects the incident inclined plane 182 and the second incident surface 184. The second light output surface 186 is set perpendicular to the second incident surface 184, and the angle θ1 between the second light output surface 186 and the incident inclined plane 182 is 45 degrees. The incident inclined plane 182 is tilted 45 degrees relative to the first direction D1.

Referring back to FIG. 1, the structure where the first emitter 14, the second emitter 16, the optical multiplexer 18, and the output port 122 are positioned allows the first light beam emitted by the first emitter 14 to enter the incident inclined plane 182 along the second direction D2, the first light beam can pass through the second filter layer 182a. Because the first light units 142 of the first emitter 14 and the output port 122 are arranged along the second direction D2, the first light beam can directly reach the second light output surface 186 and be output to the output port 122. The second emitter 16 emits the second light beam along the first direction D1, and the second light beam enters the second incident surface 184, allowing it to enter the mixing body 180 and pass through the second filter layer 182a.

As shown in FIG. 1, due to the 45-degree angle formed between the incident inclined plane 182 and the first direction D1, and because the second filter layer 182a does not allow the second light beam to pass through, the second light beam originally traveling in the first direction D1 is reflected by the second filter layer 182a. It then proceeds along the second direction D2 and exits through the second light output surface 186 to the output port 122.

The transmitter 20 is connected to the output port 122 to transmit the first light beam and the second light beam. In this embodiment, the transmitter 20 is a cable, which can be an optical fiber cable. Those skilled in the art can use optical adapters installed in the first casing 12 to connect the transmitter 20.

The receiving device 30 is connected to the transmitter 20 to receive the first light beam and the second light beam. The receiving device 30 comprises a second casing 32, a first analyzer 34, a second analyzer 36, and a beam splitter 38. The second casing 32 comprising a second accommodation space 320 and an input port 322 connected to the second accommodation space 320, and the input port 322 is further connected to at least one transmitter 20. In this embodiment, the second casing 32 is equipped with a second accommodation space 320 and an input port 322. The input port 322 is in communication with the second accommodation space 320 and is connected to the transmitter 20. Those skilled in the art can use an optical adapter placed in the second casing 32 to connect it to the transmitter 20.

The second casing 32 comprises side walls and a bottom plate oriented perpendicular to the side walls. Both the first analyzer 34 and the second analyzer 36 are positioned within the second accommodation space 320. In this embodiment, the first analyzer 34 is arranged along the side wall of the second casing 32 in a first direction D1 and is oriented in alignment with the input port in a second direction D2. The second analyzer 36 is positioned along the bottom plate of the second casing 32 in the second direction D2, the first analyzer 34 to extend vertically relative to the second analyzer 36. Both the first analyzer 34 and the second analyzer 36 can function as wavelength detectors. The first analyzer 34 comprises multiple first receiving points 342, with several of them arranged in a vertical manner along the first direction D1. In another embodiment, these multiple first receiving points 342 can be arranged in a matrix pattern. Each of these first receiving points 342 corresponds to receiving the first light beam from each first light unit 142, allowing the first analyzer 34 to analyze the first light beam. The second analyzer 36 also comprises multiple second receiving points 362, which are arranged vertically along the second direction D2. In another embodiment, these multiple second receiving points 362 can also be arranged in a matrix pattern. Each of these second receiving points 362 corresponds to receiving the second light beam from each second light unit 162, enabling the second analyzer 36 to analyze the second light beam.

The beam splitter 38 is located within the second accommodation space 320 and corresponds to the input port 322, the first analyzer 34 and the second analyzer 36 are positioned. The beam splitter 38 receives the first light beam and the second light beam, then transmits the first light beam to the first analyzer 34 and the second light beam to the second analyzer 36. This allows the first analyzer 34 to analyze the first light beam, and the second analyzer 36 to analyze the second light beam.

Figure 3:
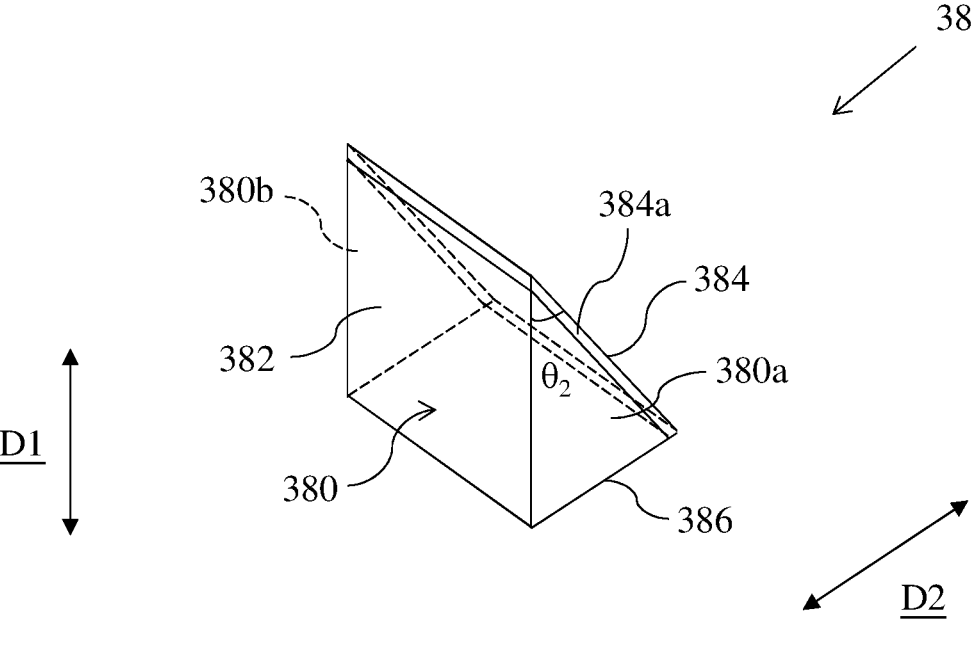
FIG. 3 is a schematic diagram illustrating a beam splitter according to the first embodiment of the present disclosure.

Referring to FIG. 3, the structure of the beam splitter 38 is explained. The beam splitter 38 comprises a splitter body 380 and a first filter layer 384*a*. The splitter body 380 has a first incident surface 382, an inclined surface 384, and a first light output surface 386. In this embodiment, the splitter body 380 can be a lens in the form of a triangular prism, such as a right-angle triangular prism. The splitter body 380 comprises two opposing right-angled triangular sides 380*a* and 380*b*, as well as three rectangular sides positioned along the edges of the two right-angled triangular sides 380*a* and 380*b*. The first incident surface 382, the inclined surface 384, and the first light output surface 386 are three of the rectangular sides arranged along the edges of the two right-angled triangular sides 380*a* and 380*b*. The material of the splitter body 380 can be glass.

The first incident surface 382 is a rectangular plane and is positioned on the splitter body 380 along the first direction D1, facing the input port 322. The first incident surface 382 and the input port 322 are arranged along the second direction D2. The first incident surface 382 is designed to receive the first light beam and the second light beam.

The inclined surface 384 is a rectangular plane, and it connects to the first incident surface 382 while being tilted relative to the first incident surface 382. The angle θ2 between the inclined surface 384 and the first incident surface 382 is 45 degrees, and the inclined surface 384 is inclined 45 degrees relative to the first direction D1. The inclined surface 384 is equipped with a first filter layer 384*a*, which is a filter sheet. The first filter layer 384*a* can also be made of glass or plastic film with added dyes, or materials like chromium oxide, among other suitable options. The first filter layer 384*a* only allows wavelengths within a fixed range to pass through, which can be in the range of 850 nm to 900 nm. In this embodiment, the first filter layer 384*a* only permits the passage of the first light beam.

The first light output surface 386 is a rectangular plane, and it is positioned on the splitter body 380 along the second direction D2. The first light output surface 386 is adjacent to the first incident surface 382 and the inclined surface 384, facing the second analyzer 36. The first light output surface 386 is oriented perpendicular to the first incident surface 382.

Referring back to FIG. 1, the structural arrangement of the input port 322, beam splitter 38, first analyzer 34, and second analyzer 34 is set up to allow the first light beam and the second light beam to enter through the input port 322 and impinge on the first incident surface 382. The first light beam and the second light beam proceed into the splitter body 380 and reach the inclined surface 384. Since the first filter layer 384*a* allows the passage of the first light beam, the first light beam can directly pass through the first filter layer 384*a* to reach the first analyzer 34. In contrast, the second light beam is reflected by the first filter layer 384*a*. Additionally, due to the angle of the inclined surface 384, the second light beam is refracted from the second direction D2 to the first direction D1, ultimately arriving at the first light output surface 386. From there, it enters the second analyzer 36.

From the above, it can be understood that with the structure provided by this invention, it is possible to achieve Wavelength Division Multiplexing (WDM) transmission technology using only a single transmission line 20. This allows the transmission of at least two different optical signals with varying wavelengths, leading to the advantage of saving on the setup of the transmission line 20 and effectively reducing production costs.

In addition to the first embodiment mentioned above, the present invention provides a second embodiment. Please refer to FIG. 4. In this embodiment, a single-fiber multiplexing transmission system 2 is comprised of an emitting device 10', at least one transmitter 20, and a receiver device 30'. The transmitter 20 is connected to the emitting device 10' and the receiver device 30'.

In this embodiment, the structure of the emitting device 10' comprises a first casing 12, a first emitter 14, a second emitter 16, a second reflection unit 19, and an optical multiplexer 18. The first casing 12 is equipped with a first accommodation space 120 and an output port 122. The output port 122 is connected to the first accommodation space 120 and is linked to the transmitter 20. Both the first emitter 14 and the second emitter 16 are positioned within the first accommodation space 120.

In this embodiment, the first emitter 14 and the second emitter 16 are arranged side by side on the bottom plate of the first casing 12, allowing them to be oriented along the second direction D2. The first emitter 14 emits the first light beam in the first direction D1, while the second emitter 16 emits the second light beam, also in the first direction D1. The first light beam and the second light beams have different wavelengths. In this embodiment, the structure of the first emitter 14 and the second emitter 16 is the same as in the first embodiment mentioned above, and, therefore, it is not described again.

Figure 4:
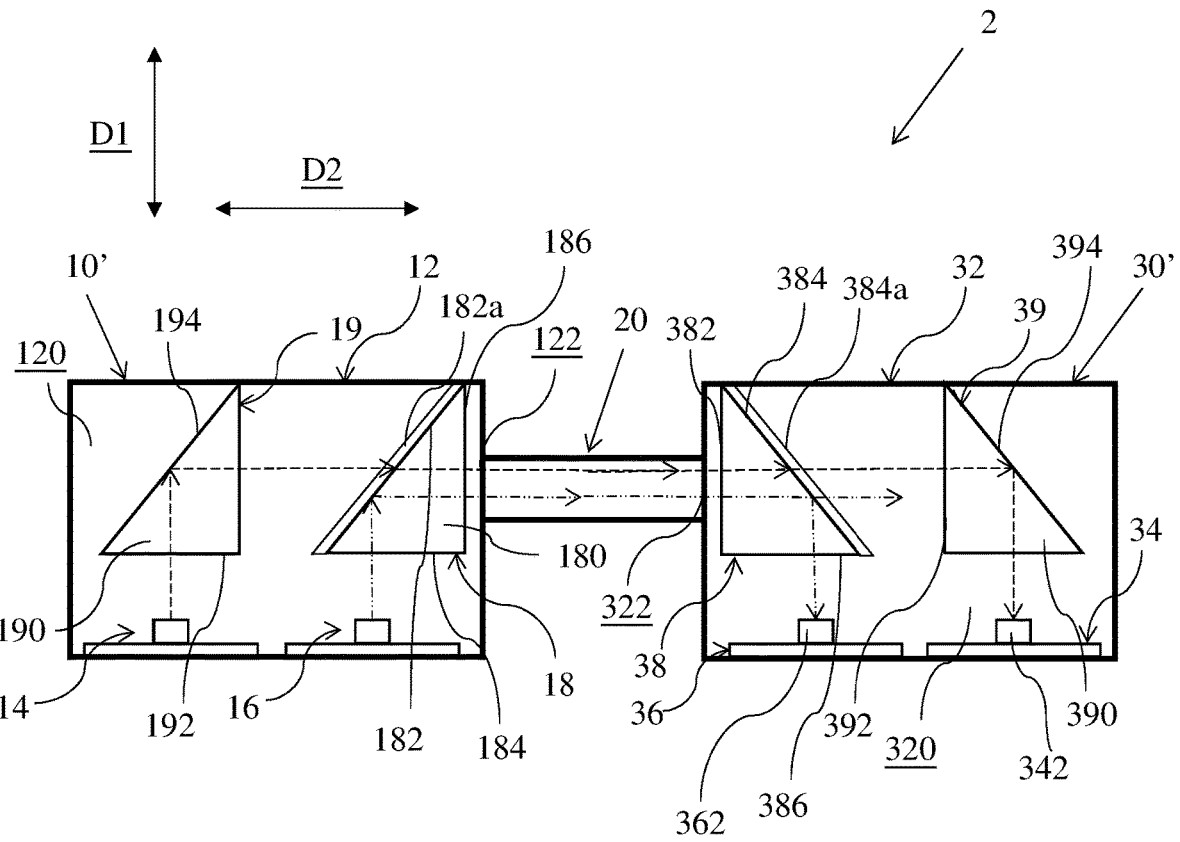
FIG. 4 is a cross-sectional schematic diagram illustrating a single-fiber multiplexing transmission system according to a second embodiment of the present disclosure.
Figure 5:
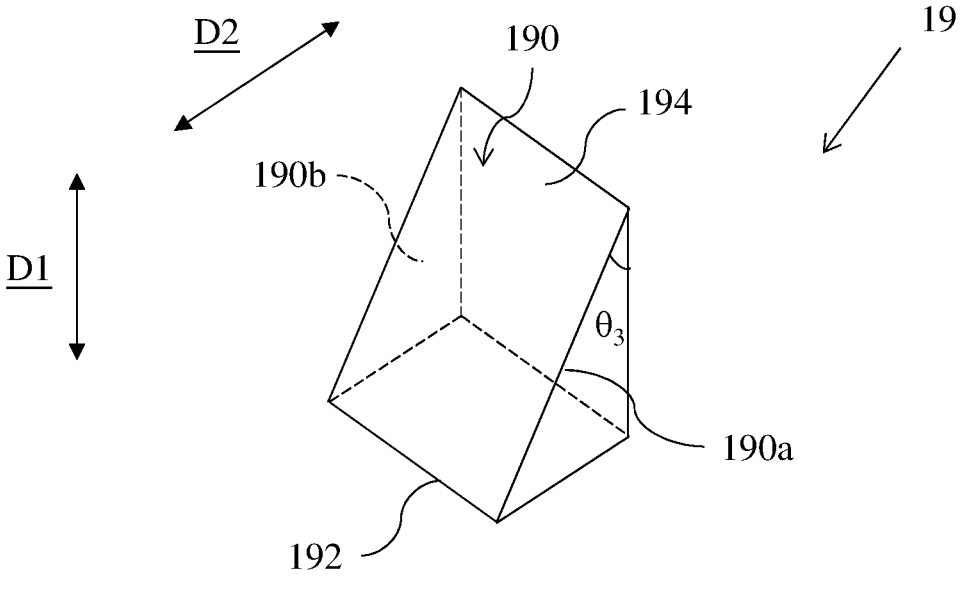
FIG. 5 is a schematic diagram illustrating a second reflection unit according to the second embodiment of the present disclosure.

In accordance with FIGS. 4 and 5, the second reflection unit 19 is positioned within the first accommodation space 120 and is configured to correspond to the first emitter 14. It receives the first light beam and reflects it toward the optical multiplexer 18.

The second reflection unit 19 consists of a second reflecting body 190, which features a second light incident plane 192 and a second reflective incline plane 194. The second reflecting body 190 can be in the form of a lens, such as a right-angle triangular prism. The material of the second reflecting body 190 can be glass. It comprises two opposing right-angled triangular sides 190a and 190b, as well as three rectangular sides positioned along the edges of the two right-angled triangular sides 190a and 190b. The second light incident plane 192 and the second reflective incline plane 194 are two of the rectangular sides arranged along the edges of the two right-angled triangular sides 190a and 190b.

In more detail, the second light incident plane 192 is a rectangular plane, positioned on the second reflecting body 190 along the second direction D2, facing the first emitter 14. The second reflective incline plane 194 is a rectangular plane, placed on the second reflecting body 190 and adjacent to the second light incident plane 192. The second reflective incline plane 194 is inclined relative to the second light incident plane 192, with an angle θ3 of 45 degrees between them. The second reflective incline plane 194 is inclined 45 degrees relative to the first direction D1. The second reflective incline plane 194 can act as a reflecting mirror, and when the first emitter 14 emits the first light beam in the first direction D1, it reflects the first light beam to the second direction D2 and directs it towards the optical multiplexer 18.

The optical multiplexer 18 is positioned adjacent to the second reflection unit 19 along the second direction D2, within the first accommodation space 120. The optical multiplexer 18, the second reflection unit 19, and the output port 122 are arranged along the second direction D2. The structure of the optical multiplexer 18 in this embodiment is the same as in the first embodiment mentioned above and, therefore, is not described again.

Referring back to FIG. 4, in this embodiment, the structure set up by the first emitter 14, the second emitter 16, the optical multiplexer 18, the second reflection unit 19, and the output port 122, let the first light beam emitted by the first emitter 14 in the first direction D1 is directed into the second reflecting body 190 through the second light incident plane 192. Due to the inclined nature of the second light incident plane 192, the first light beam originally emitted in the first direction D1 is refracted to be emitted in the second direction D2, allowing it to be transmitted to the entrance incident inclined plane 182 of the optical multiplexer 18. The first light beam can pass through the second filter layer 182a and is then directed to the second light output surface 186, ultimately being output through the output port 122.

The second emitter 16 emits the second light beam along the first direction D1, and this second light beam is directed into the second incident surface 184 along the first direction D1, allowing it to enter the mixing body 180 and reach the second filter layer 182a. As the second filter layer 182a does not permit the second light beam to pass through, and the incident inclined plane 182 is inclined in the first direction D1, the second light beam is refracted from its original first direction D1 to the second direction D2, ultimately arriving at the second light output surface 186 and being output through the output port 122.

The transmitter 20 is connected to the output port 122 to transmit the first light beam and the second light beam. In this embodiment, the transmitter 20 is a cable and can be an optical fiber cable. Those skilled in the art can use an optical adapter installed in the first casing 10 to connect the transmitter 20.

The receiving device 30' is connected to the transmitter 20 to receive the first light beam and the second light beam. The receiving device 30' comprises a second casing 32, a first analyzer 34, a second analyzer 36, a beam splitter 38, and a first reflecting unit 39. The second casing 32 is equipped with a second accommodation space 320 and an input port 322. The input port 322 is connected to the second accommodation space 320 and is linked to the transmitter 20. Those skilled in the art can use an optical adapter installed in the second casing 32 to connect the transmitter 20.

The second casing 32 features a bottom plate oriented along the second direction D2. Both the first analyzer 34 and the second analyzer 36 are positioned within the second accommodation space 320. In this embodiment, the first analyzer 34 is located adjacent to the second analyzer 36 and both are oriented along the second direction D2, positioned on the bottom plate of the second casing 32. The structure of the first analyzer 34 and the second analyzer 36 in this embodiment is the same as in the first embodiment mentioned above, and, therefore, it is not described again.

The structure and positioning of the beam splitter 38 are the same as in the first embodiment mentioned above, and, therefore, are not described again.

Figure 6:
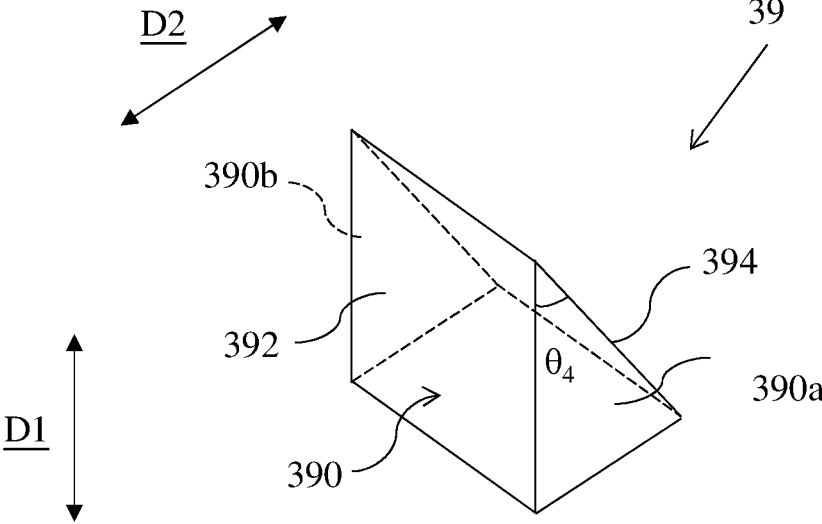
FIG. 6 is a schematic diagram illustrating a first reflecting unit according to the second embodiment of the present disclosure.

In reference to FIGS. 4 and 6, let's explain the structure and positioning of the first reflecting unit 39. The first reflecting unit 39 is positioned within the second accommodation space 320 and is arranged along the second direction D2, designed to receive the first light beam and reflect it to the first analyzer 34. Please refer to FIG. 6, the structure of the first reflecting unit 39 comprises a first reflecting body 390. The first reflecting body 390 features a first light incident plane 392 and a first reflective incline plane 394. The first reflecting body 390 can be a lens in the form of a triangular prism, such as a right-angled triangular prism. The first reflecting body 390 comprises opposing sides of two right-angled triangular shapes, denoted as sides 390a and 390b, and three rectangular sides that surround the edges of the two right-angled triangular sides 390a and 390b. The first light incident plane 392 and the first reflective incline plane 394 are rectangular sides, positioned at the edges of the sides 390a and 390b. The material of the first reflecting body 390 can be glass.

In more detail, the first light incident plane 392 is a rectangular flat surface positioned on the first reflecting body 390. The first light incident plane 392 extends along the first direction D1 and is oriented towards the beam splitter 38. The first reflective incline plane 394 is positioned on the first reflecting body 390 and is adjacent to the first light incident plane 392. The first reflective incline plane 394 is inclined on the first reflecting body 390, and the angle θ4 between the first light incident plane 392 and the first reflective incline plane 394 is 45 degrees. The first reflective incline plane 394 can be a reflective surface, and when the beam splitter 38 directs the first light beam to the first reflecting unit 39, the first reflective incline plane 394 reflects the first light beam to the first analyzer 34.

Referring to FIG. 4, the structure of the input port 322, the beam splitter 38, the first reflecting unit 39, the first analyzer 34, and the second analyzer 34 is set up in such a way that when the first light beam and the second light beam enter through the input port 322, they enter the first incident surface 382 from the second direction D2, continuing into the splitter body 380 and reaching the inclined surface 384. Because the first filtering layer 384*a* allows the first light beam to pass through, the first light beam can directly pass through the first filtering layer 384*a* and exit through the first reflecting unit 39 in the second direction D2. The second light beam is reflected by the first filtering layer 384*a*, and due to the angle of the incline plane 384, the original second light beam in the second direction D2 is refracted into the first direction D1 towards the first light output surface 386, entering the second analyzer 36.

After the first light incident plane 392 receives the first light beam, it enters the first reflecting body 390, and the first light beam is projected onto the first reflective incline plane 394. Due to the inclined nature of the first reflective incline plane 394, it refracts the first light beam from the second direction D2 into the first direction D1 towards the first analyzer 34.

As described above, the structure of the present invention allows achieving wavelength division multiplexing (WDM) transmission technology using a single transmission line, thus enabling the transmission of at least two different optical signals. This leads to the benefit of saving the setup of transmission lines and effectively reducing production costs.

Many details are often found in the relevant art and many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. A single-fiber multiplex transmission system, comprising:

an emitting device, comprising:

a first casing comprising a first accommodation space and an output port, and the output port is connected to the first accommodation space;

a first emitter is disposed in the first accommodation space, the first emitter emits a first light beam;

a second emitter is disposed in the first accommodation space, the second emitter emits a second light beam; and an optical multiplexer is disposed in the first accommodation space and is arranged to correspond to the first emitter and the second emitter, the optical multiplexer receives the first light beam and the second light beam, and transmits the first light beam and the second light beam to the output port;

at least one transmitter is connected to the output port to transmit the first light beam and the second light beam; and a receiving device is connected to the at least one transmitter to receive the first light beam and the second light beam, the receiving device comprising:

a second casing comprising a second accommodation space and an input port connected to the second accommodation space, and the input port is further connected to the at least one transmitter;

a first analyzer is disposed in the second accommodation space;

a second analyzer is disposed in the second accommodation space; and a beam splitter is disposed in the second accommodation space and is arranged to correspond to the input port, the first analyzer, and the second analyzer, the beam splitter receives the first light beam and the second light beam, transmits the first light beam to the first analyzer, and transmits the second light beam to the second analyzer for the first analyzer and the second analyzer to analyze the first light beam and the second light beam, the beam splitter comprises:

a splitter body;

a first incident surface on the splitter body and arranged to correspond to the input port to receive the first light beam and the second light beam;

an inclined surface connected to the first incident surface, and a first filter layer on the inclined surface; and a first light output surface arranged on the splitter body, adjacent and perpendicular to the first incident surface, and further arranged to correspond to the second analyzer to receive a reflection from the inclined surface, wherein, the first light beam and the second light beam enter the splitter body from the first incident surface to the inclined surface, the first light beam is transmitted through the first filter layer to incident on the first analyzer, and the second light beam is reflected by the first filter layer to the first light output surface and then directed to the second analyzer.

2. The system of claim 1, wherein an angle between the inclined surface and the first incident surface is 45 degrees.

3. The system of claim 1, wherein the receiving device further comprises:

a first reflecting unit is arranged to correspond to the beam splitter and the first analyzer to receive the first light beam and reflect the first light beam to the first analyzer, the first reflecting unit comprises:

a first reflecting body;

a first light incident plane is disposed on the first reflecting body and is arranged to correspond to the inclined surface to receive the first light beam; and a first reflective incline plane is provided adjacent to the first light incident plane to receive and reflect the first light beam to the first analyzer.

4. The system of claim 1, wherein the splitter body is a lens in a shape of a triangular prism.

5. The system of claim 1, wherein the optical multiplexer comprises:

a mixing body;

an incident inclined plane is disposed on the mixing body with a second filter layer disposed on the inclined incident plane, the incident inclined plane receives the first light beam to enable the first light beam to pass through the second filter layer;

a second incident surface is disposed on the mixing body and adjacent to the incident inclined plane, the second light beam enters the mixing body through the second incident surface and is reflected by the second filter layer; and a second light output surface is connected to the incident inclined plane and the second incident surface and is arranged perpendicularly to the second incident surface, the second light output surface is arranged to correspond to the output port, the first light beam and the second light beam are emitted from the second light output surface to the output port.

6. The system of claim 5, wherein the emitting device further comprises a second reflecting unit positioned within the first accommodation space and corresponding to the first emitter, the second reflecting unit receives the first light beam and reflects the first light beam towards the optical multiplexer, the second reflecting unit comprises:

a second reflecting body;

a second light incident plane is disposed on the second reflecting body and corresponding to the first emitter for receiving the first light beam; and a second reflective incline plane is positioned adjacent to the second light incident plane and corresponding to the incident inclined plane for reflecting the first light beam towards the optical multiplexer.

7. The system of claim 5, wherein the mixing body is a lens in a shape of a triangular prism.

8. The system of claim 1, wherein the first emitter comprises:

a first substrate; and at least one first light unit is disposed on the first substrate to emit the first light beam.

9. The system of claim 8, wherein the at least one first light unit is a light-emitting diode (LED).

10. The system of claim 1, the second emitter comprises:

a second substrate; and at least one second light unit is disposed on the second substrate to emit the second light beam.

11. The system of claim 10, wherein the at least one second light unit is a light-emitting diode (LED).

12. The system of claim 1, wherein the first light beam and the second light beam have different wavelengths.

13. The system of claim 1, wherein the at least one transmitter is a cable.

14. The system of claim 1, wherein the first emitter and the second emitter are an emitter utilizing a Vertical Cavity Surface-Emitting Laser (VCSEL) technology.

* * * * *